US009431188B2

(12) United States Patent
Maloney et al.

(10) Patent No.: US 9,431,188 B2
(45) Date of Patent: Aug. 30, 2016

(54) CIRCUIT BREAKERS HAVING ENLARGED PRESSURE RELIEF VALVES AND RELATED ELECTRICAL DISTRIBUTION PANELS AND SYSTEMS

(71) Applicant: Eaton Corporation, Cleveland, OH (US)

(72) Inventors: James G. Maloney, Industry, PA (US); Jeffrey S. Gibson, Hookstown, PA (US)

(73) Assignee: Eaton Corporation, Cleveland, OH (US)

( * ) Notice: Subject to any disclaimer, the term of this patent is extended or adjusted under 35 U.S.C. 154(b) by 164 days.

(21) Appl. No.: 14/068,678

(22) Filed: Oct. 31, 2013

(65) Prior Publication Data

US 2015/0116912 A1 Apr. 30, 2015

(51) Int. Cl.

*H01H 9/02* (2006.01)
*H01H 9/34* (2006.01)
*H01H 9/04* (2006.01)
*H01H 85/00* (2006.01)
*H02B 13/00* (2006.01)

(52) U.S. Cl.

CPC ............... *H01H 9/02* (2013.01); *H01H 9/043* (2013.01); *H01H 9/342* (2013.01); *H02B 13/00* (2013.01); *H01H 2009/343* (2013.01); *H01H 2085/0004* (2013.01); *H01H 2213/00* (2013.01)

(58) Field of Classification Search

CPC ........ H01H 9/02; H01H 9/043; H01H 9/342; H01H 2009/343; H01H 2085/0004; H01H 2213/00; H02B 13/00

USPC .................................................. 361/600–678

See application file for complete search history.

(56) References Cited

U.S. PATENT DOCUMENTS 3,621,169 A * 11/1971 Heft et al. .................... 218/152
4,393,288 A * 7/1983 Belttary ................. H01H 73/18 218/155
4,631,376 A * 12/1986 Leone .................... H01H 9/342 137/855
4,650,940 A * 3/1987 Grunert .................. H01H 9/342 200/304
5,569,894 A * 10/1996 Uchida .................. H01H 9/342 200/306
5,861,683 A * 1/1999 Engel ................. G01R 19/2513 307/147
2005/0199845 A1* 9/2005 Jones .................... F16K 15/031 251/129.06
2006/0151439 A1* 7/2006 Shea ...................... H01H 9/346 218/149
2008/0167755 A1 7/2008 Curt
2011/0115460 A1* 5/2011 Elliott .................... H01H 50/02 323/285
2012/0327563 A1* 12/2012 Cook ........................ H02J 4/00 361/624

FOREIGN PATENT DOCUMENTS

EP 0 176 869 4/1986

OTHER PUBLICATIONS

Notification of Transmittal of the International Search Report and the Written Opinion of the International Searching Authority, or the Declaration, PCT/US2014/062503, Jan. 15, 2015, 12 pages.

Notification Concerning Transmittal of International Preliminary Report on Patentability, PCT/US2014/062503, May 12, 2016, 9 pages.

* cited by examiner

*Primary Examiner* — Anthony Haughton
*Assistant Examiner* — Yahya Ahmad
(74) *Attorney, Agent, or Firm* — Myers Bigel & Sibley

(57) ABSTRACT

Circuit breakers are provided including a pressure release valve. The pressure release valve includes a vent portion and barrier portion. The barrier portion is configured to open when exposed to excessive heat generated by an arc and allow gases to escape from the circuit breaker. Related electrical distribution panels and systems are also provided.

19 Claims, 4 Drawing Sheets

340/350

GAS

GAS

CIRCUIT BREAKERS HAVING ENLARGED PRESSURE RELIEF VALVES AND RELATED ELECTRICAL DISTRIBUTION PANELS AND SYSTEMS

FIELD

The inventive concept relates generally to circuit breakers and, more particularly, to circuit breakers having pressure relief valves.

BACKGROUND

A circuit breaker is an electrical distribution device that is used to control the flow of electrical current into a circuit. The circuit breaker is generally configured to open under abnormal operating conditions, such as a short circuit. In some circuit breakers, when the circuit breaker opens, a stationary contact and a moveable contact within the circuit are configured to separate. The separation of these contacts can create an arc that needs to be cooled/quenched before the heat from the arc destroys the circuit breaker.

Arcs can be cooled using arc quenching gases generated by arc quenching materials within the circuit breaker. For example, the contacts in the circuit breaker may be surrounded by arc quenching materials, such as nylon, fish paper, aluminum tri hydrate (ATH) and the like. When an arc occurs, these materials create an arc quenching gas, but excessive pressures caused by the gases may cause the plastic material housing the circuit breaker to crack or burst.

SUMMARY

Some embodiments of the inventive concept provide circuit breakers including a pressure release valve including a vent portion and barrier portion. The barrier portion is configured to open when exposed to excessive heat generated by an arc and allow gases to escape from the circuit breaker.

In further embodiments, the barrier portion may include a plastic that is configured to bend responsive to the excessive heat caused by the arc. The plastic may include a shape memory polymer. In certain embodiments, the material of the barrier portion may not be plastic. For example, the material may be a metal or fish paper.

In still further embodiments, the vent portion may have a diameter that is greater than ⅛ inch.

In some embodiments, the gases may include arc quenching gases produce by arc quenching materials provided in the circuit breaker. The arc quenching materials may include aluminum tri hydrate (ATH), nylon and/or fish paper.

In further embodiments, the circuit breaker may include a smart circuit breaker in communication with a communication circuit associated with a load center.

Still further embodiments of the present inventive concept provide electrical distribution panels configured to receive a circuit breaker. The electrical distribution panel includes a housing; a frame coupled to the housing; and a pressure release valve in the housing. The pressure release valve includes a vent portion and barrier portion. The barrier portion is configured to open when exposed to excessive heat generated by an arc and allow gases to escape from the circuit breaker.

Some embodiments of the present inventive concept provide electrical distribution systems including a housing; and a load center and a circuit breaker in the housing. The housing includes a pressure release valve including a vent portion and barrier portion. The barrier portion is configured to open when exposed to excessive heat generated by an arc and allow gases to escape from the circuit breaker.

DETAILED DESCRIPTION OF EMBODIMENTS

Figure 1:
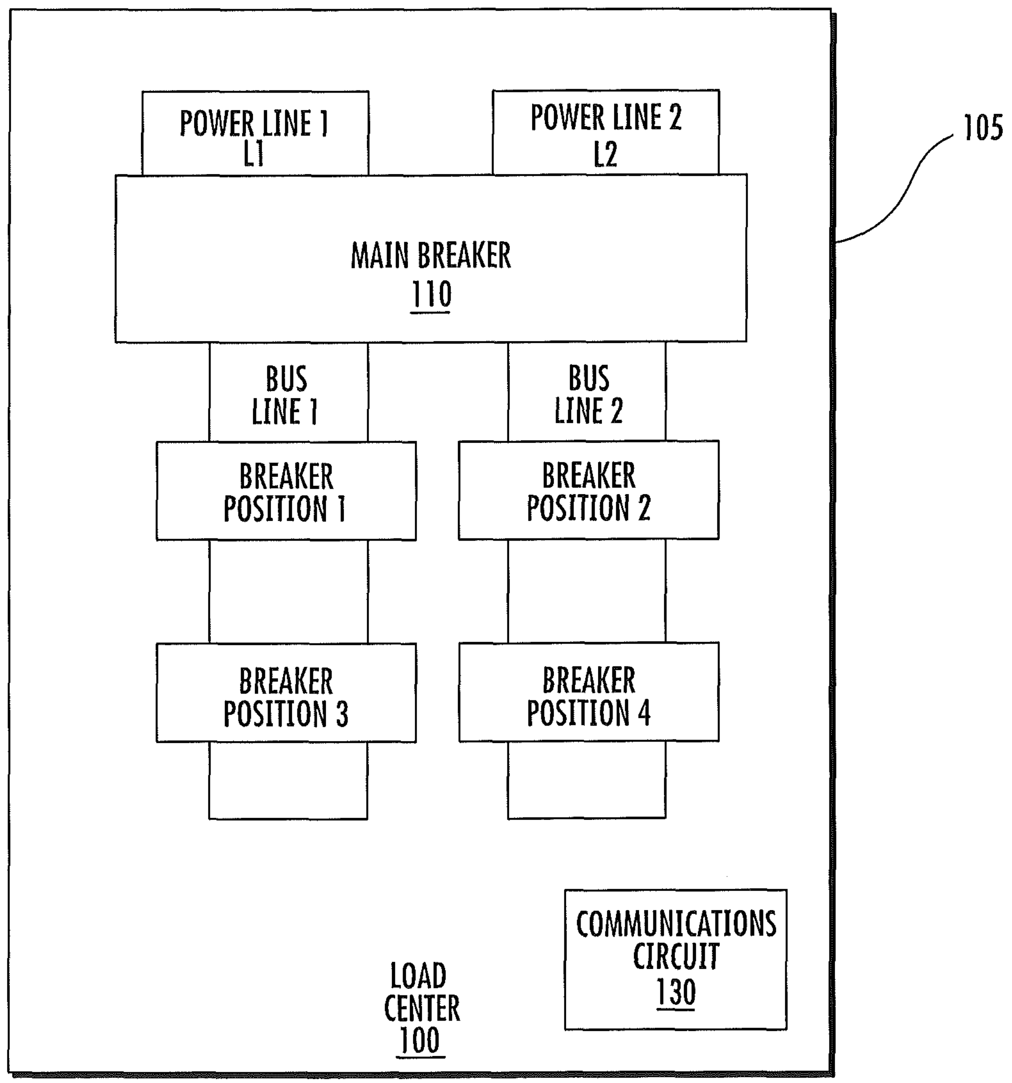
FIG. 1 is a block diagram of a circuit breaker in accordance with some embodiments of the present inventive concept.

The inventive concept now will be described more fully hereinafter with reference to the accompanying drawings, in which illustrative embodiments of the inventive concept are shown. In the drawings, the relative sizes of regions or features may be exaggerated for clarity. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art.

It will be understood that when an element is referred to as being “coupled” or “connected” to another element, it can be directly coupled or connected to the other element or intervening elements may also be present. In contrast, when an element is referred to as being “directly coupled” or “directly connected” to another element, there are no intervening elements present. Like numbers refer to like elements throughout. As used herein the term “and/or” includes any and all combinations of one or more of the associated listed items.

In addition, spatially relative terms, such as “under”, “below”, “lower”, “over”, “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “under” or “beneath” other elements or features would then be oriented “over” the other elements or features. Thus, the exemplary term “under” can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As discussed above, a circuit breaker is an electrical distribution device that is used to control the flow of electrical current into a circuit. The circuit breaker is generally configured to open under abnormal operating conditions, such as a short circuit. In some circuit breakers, when the circuit breaker opens, a stationary contact and a moveable contact within the circuit are configured to separate. The separation of these contacts can create an arc that needs to be cooled/quenched before the heat from the arc destroys the circuit breaker.

Arcs can be cooled using arc quenching gases generated by arc quenching materials within the circuit breaker. For example, the contacts in the circuit breaker may be surrounded by arc quenching materials, such as nylon, fish paper, aluminum tri hydrate (ATH) and the like. When an arc occurs, these materials create arc quenching gases, but excessive pressures caused by these gases may cause the plastic material housing the circuit breaker to crack or break. Thus, one limiting factor to creating large amounts of arc quenching gases during high fault currents are the excessive pressures created by the gases.

Accordingly, embodiments of the present inventive concept provide pressure relief valves configured to open when exposed to excessive heat generated by a high fault current. Opening the valve may allow release of the arc quenching gases before the plastic housing of the circuit breaker cracks from the pressure created by the gases trapped therein. As will be discussed herein with respect to FIGS. 1 through 4 below, some of the pressure relief valves in accordance with embodiments of the present inventive concept include a vent portion and a barrier portion located over the vent portion. The barrier portion may be made of a plastic material configured to bend responsive to high temperatures, which creates an opening through which the gases can escape before the pressure of the trapped gases damages the plastic housing of the breaker.

It will be understood that although embodiments of the present inventive concept are discussed herein with respect to a vent in combination with a barrier including a plastic material, embodiments of the present inventive concept are not limited thereto. For example, some embodiments may include a pressure relief valve including steel springs triggered by the heat causing the valve to open and the gas to escape without departing from the scope of the present inventive concept. Furthermore, the material of the barrier is not limited to plastic, for example, the material could be a metal or fish paper without departing from the scope of the present inventive concept.

Referring now to FIG. 1, a block diagram of an electrical distribution panel or load center in accordance with some embodiments of the present inventive concept will be discussed. As illustrated in FIG. 1, the load center 100 includes an enclosure 105. The enclosure includes 2 power lines L1 and L2, a main breaker 110 coupled to first and second bus lines 1 and 2, respectively, and a plurality of breaker positions 1-4 connected to the bus lines 1 and 2.

It will be understood that although the load center 100 is shown as including a single main breaker 110 and four breaker positions, embodiments of the present inventive concept are not limited to this configuration. For example, load centers can incorporate two or more circuit breakers to provide a safe and controllable distribution of electric power. Each of the circuit breakers can have forty or more breaker positions without departing from the scope of the present inventive concept. Such load centers 100 have become a common feature in both residential and commercial structures.

Furthermore, the circuit breaker of FIG. 1 is a smart breaker and, thus, has the capability of communicating with a communications circuit 130. A smart circuit breaker can be monitored and managed remotely. Although FIG. 1 illustrates a smart circuit breaker, embodiments of the present inventive concept are not limited to this configuration. Pressure relief valves in accordance with embodiments of the present inventive concept can be used in combination with any type of circuit breaker that can benefit from an improved gas release capabilities.

When an arc occurs in the circuit breaker it should be extinguished within about half an arc cycle, for example, the arc should be extinguished within about 8.0 ms. As discussed above, arc quenching materials can be provided around the contacts in the circuit breaker to produce arc quenching gases to cool/quench the arc. These materials may include, for example, nylon, fish paper, aluminum tri hydrate (ATH) and may be mixed with, for example, molding compound. In a conventional device, when the arc occurs, the gas from these materials builds up within about 2.0 ms and may cause the plastic housing of the circuit breaker to break or crack. Conventional devices may include vent channels, but the size of these vents (holes) are limited by underwriting lab (UL) standards, which limits a diameter of a hole in the plastic housing to ⅛ inch. Thus, the amount of possible venting is limited by the small diameter of the hole.

Figure 2:
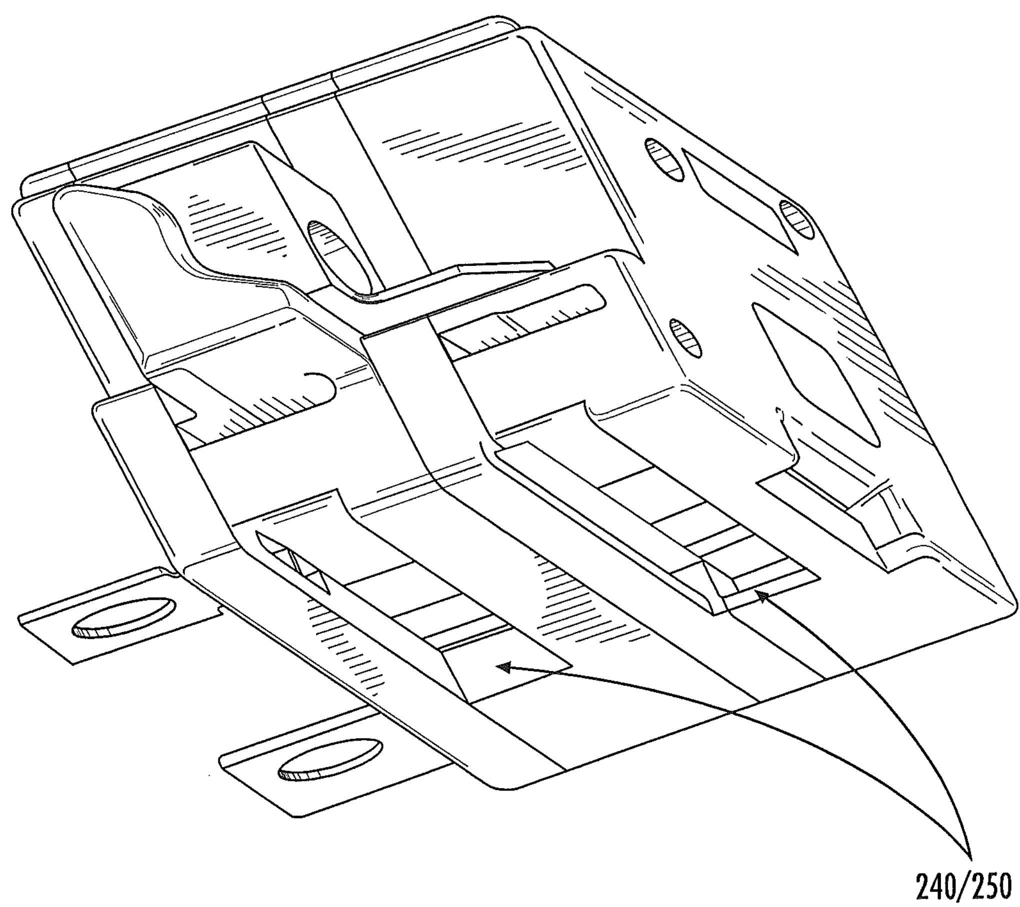
FIG. 2 is a diagram of a circuit breaker including pressure relief valves in accordance with some embodiments of the present inventive concept.
Figure 3:
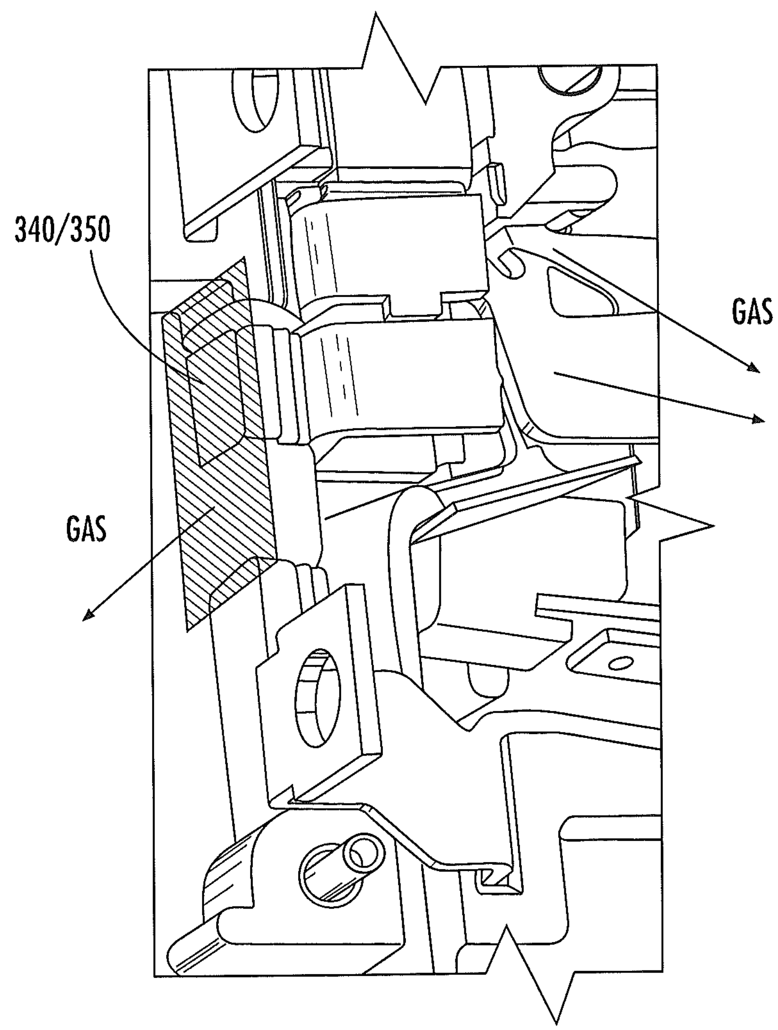
FIG. 3 is a diagram of a circuit breaker including a pressure relief valve in accordance with some embodiments of the present inventive concept.
Figure 4:
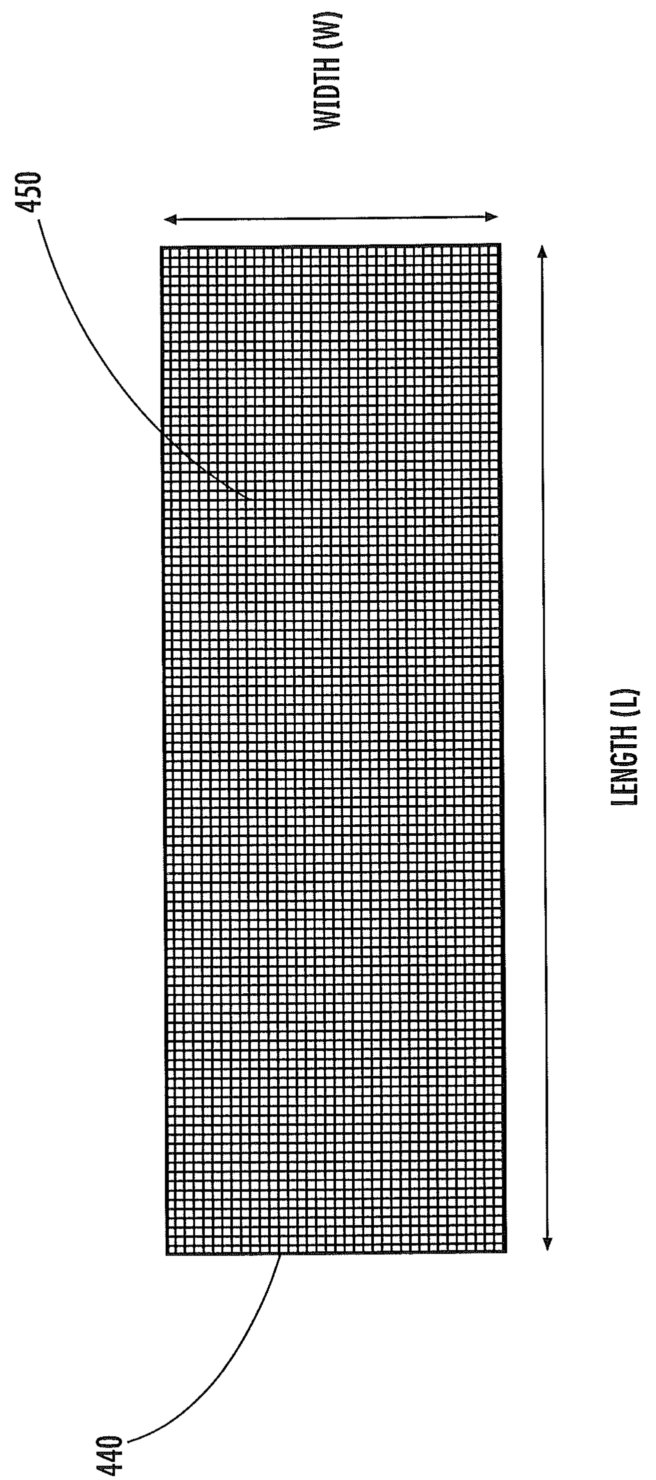
FIG. 4 is a diagram of a pressure relief valve in accordance with some embodiments of the present inventive concept.

As illustrated in FIGS. 2 through 4, some embodiments of the present inventive concept include a pressure relief valve including a vent 240, 340 and a barrier 250, 35Q over the vent. Since the vent 24Q, 340 is covered by the barrier 250, 350, the size of pressure relief valve in accordance with embodiments discussed herein is not limited by the UL standard. Thus, the pressure relief valve in accordance with embodiments discussed herein can be made much larger and, therefore, allow more gas to escape more quickly.

In particular, as illustrated in FIG. 2, one or more pressure relief valves may be provided on any portion of the circuit breaker. The pressure release valve may include a vent channel 240 and a barrier 250 positioned thereon. In some embodiments, the barrier 250 may include a temperature activated plastic configured to bend to create an opening responsive to the heat of the arc such that excessive internal pressures caused by the arc quenching gases can be released to avoid damage to or destruction of the circuit breaker.

In some embodiments, the barrier 250 may be made of, for example, a shape memory polymer provided by Dynalloy, Inc. As discussed above, although the barrier 250 is discussed as being a plastic material that bends with heat in accordance with some embodiments of the present inventive concept, embodiments are not limited thereto.

As further illustrated in FIG. 3, the pressure relief valve including the vent 340 and the barrier 350 may allow the arc quenching gases to escape more rapidly and, therefore, allow more arc quenching material in the circuit breaker without damaging or destroying the plastic housing of the breaker.

Referring now to FIG. 4, because the vent 440 is covered with the barrier 450, the size of the pressure relief valve is not limited by the UL standard of a ⅛ inch diameter. The size of the pressure relief valve in accordance with embodiments of the present inventive concept is only limited by the size of the circuit breaker on which it is used. Placement of the pressure relief valve can be in any practical location on the circuit breaker. As illustrated in FIG. 4, the vent 440 may have a length (L) and a width (W) relative to the size of the circuit breaker. Thus, smaller circuit breakers may have small pressure relief valves. Similarly, larger circuit breakers may have large pressure relief valves. Although the pressure relief valve is illustrated in FIG. 4 as having a rectangular shape, embodiments of the present inventive concept are not limited to this configuration. The pressure relief valve can have any shape, for example, circular, square and the like, without departing from the scope of the present inventive concept.

As discussed briefly above, using a pressure relief valve in accordance with embodiments of the present inventive concept, large amounts of arc quenching gases can be created during high fault currents without creating excessive pressures causing the plastic of the housing to crack or break. As discussed above, when the barrier over the vent is exposed to excessive heat caused by the arc, the plastic barrier bends to allow gasses to escape. Thus, gases do not build up inside the circuit breaker causing damage to the breaker housing.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

That which is claimed:

1. A circuit breaker comprising:

a housing; and a pressure release valve on an exterior portion of the housing, the pressure release valve including a vent portion and barrier portion, the barrier portion being configured to open the vent portion when exposed to excessive heat generated by an arc and allow gases to escape from the circuit breaker, wherein the gases comprise arc quenching gases produced by arc quenching materials provided in the circuit breaker.

2. The circuit breaker of claim 1, wherein the barrier portion comprises a plastic that is configured to bend responsive to the excessive heat caused by the arc.

3. The circuit breaker of claim 1, wherein the barrier portion comprises one of a metal or fish paper.

4. The circuit breaker of claim 2, wherein the plastic comprises a shape memory polymer.

5. The circuit breaker of claim 1, wherein the vent portion has a diameter that is greater than ⅛ inch.

6. The circuit breaker of claim 1, wherein the arc quenching materials comprise at least one of aluminum tri hydrate (ATH) and fish paper.

7. The circuit breaker of claim 1, wherein the circuit breaker comprises a smart circuit breaker in communication with a communication circuit associated with a load center.

8. An electrical distribution panel configured to receive a circuit breaker, the electrical distribution panel comprising:

a housing; and a pressure release valve on an exterior portion of the housing, the pressure release valve including a vent portion and barrier portion, the barrier portion being configured to open the vent portion when exposed to excessive heat generated by an arc and allow gases to escape from the circuit breaker, wherein the gases comprise arc quenching gases produced by arc quenching materials provided in the circuit breaker.

9. The electrical distribution panel of claim 8, wherein the barrier portion comprises a plastic that is configured to bend responsive to the excessive heat caused by the arc.

10. The electrical distribution panel of claim 9, wherein the plastic comprises a shape memory polymer.

11. The electrical distribution panel of claim 8, wherein the vent portion has a diameter that is greater than ⅛ inch.

12. The electrical distribution panel of claim 8, wherein the arc quenching materials comprise at least one of aluminum tri hydrate (ATH) and fish paper.

13. The electrical distribution panel of claim 8, wherein the circuit breaker comprises a smart circuit breaker in communication with a communication circuit associated with a load center.

14. An electrical distribution system comprising:

a housing;

a load center; and a circuit breaker in the housing, the housing including a pressure release valve on an exterior portion of the housing including a vent portion and barrier portion, the barrier portion being configured to open the vent portion when exposed to excessive heat generated by an arc and allow gases to escape from the circuit breaker, wherein the gases comprise arc quenching gases produced by arc quenching materials provided in the circuit breaker.

15. The electrical distribution system of claim 14, wherein the barrier portion comprises a plastic that is configured to bend responsive to the excessive heat caused by the arc.

16. The electrical distribution system of claim 15, wherein the plastic comprises a shape memory polymer.

17. The electrical distribution system of claim 16, wherein the vent portion has a diameter that is greater than ⅛ inch.

18. The electrical distribution system of claim 14, wherein the arc quenching materials comprise at least one of aluminum tri hydrate (ATH) and fish paper.

19. The electrical distribution system of claim 14, wherein the circuit breaker comprises a smart circuit breaker in communication with a communication circuit associated with the load center.

* * * * *